(12) United States Patent
Ingerman et al.

(10) Patent No.: US 11,037,230 B2
(45) Date of Patent: Jun. 15, 2021

(54) ONLINE UNIVERSAL CREDIT APPLICATION

(75) Inventors: David Bruce Ingerman, Summit, NJ (US); Neel Lee Chauhan, Montclair, NJ (US); Jeffrey Lewis Kaufman, Foster City, CA (US)

(73) Assignee: DUN AND BRADSTREET, INC., Short Hills, NJ (US)

( * ) Notice: Subject to any disclaimer, the term of this patent is extended or adjusted under 35 U.S.C. 154(b) by 434 days.

(21) Appl. No.: 12/231,110

(22) Filed: Aug. 29, 2008

(65) Prior Publication Data
US 2009/0157542 A1 Jun. 18, 2009

Related U.S. Application Data

(60) Provisional application No. 61/007,675, filed on Dec. 14, 2007.

(51) Int. Cl.
*G06Q 40/00* (2012.01)
*G06Q 40/02* (2012.01)

(52) U.S. Cl.
CPC .......... *G06Q 40/02* (2013.01); *G06Q 40/025* (2013.01)

(58) Field of Classification Search
CPC .............................. G06Q 40/025; G06Q 40/02
USPC ...................................................... 705/34–45
See application file for complete search history.

(56) References Cited

U.S. PATENT DOCUMENTS

| | | | | |
|---|---|---|---|---|
| 5,930,776 A | * | 7/1999 | Dykstra | G06Q 40/00 705/35 |
| 7,881,994 B1 | * | 2/2011 | An | G06Q 40/00 705/35 |
| 8,046,298 B1 | * | 10/2011 | Voth et al. | 705/38 |
| 8,489,497 B1 | * | 7/2013 | Novak | G06Q 40/025 705/38 |
| 2002/0107765 A1 | * | 8/2002 | Walker | G06Q 30/02 705/35 |
| 2003/0041020 A1 | * | 2/2003 | Kogler et al. | 705/38 |
| 2003/0125990 A1 | * | 7/2003 | Rudy | G06Q 30/06 705/4 |
| 2003/0182229 A1 | | 9/2003 | Siegel et al. | |
| 2004/0030649 A1 | * | 2/2004 | Nelson | G06Q 40/00 705/44 |
| 2004/0088246 A1 | * | 5/2004 | Jepsen | G06Q 10/10 705/38 |
| 2004/0138997 A1 | * | 7/2004 | DeFrancesco et al. | 705/38 |
| 2004/0177030 A1 | * | 9/2004 | Shoham | G06Q 30/02 705/38 |
| 2005/0085937 A1 | * | 4/2005 | Goodwin et al. | 700/107 |

(Continued)

OTHER PUBLICATIONS

Carl G. Kline, "Credit Application II", copyright 1997-2003.*

(Continued)

*Primary Examiner* — Chia-Yi Liu
(74) *Attorney, Agent, or Firm* — Ohlandt, Greeley, Ruggiero & Perle, L.L.P.

(57) ABSTRACT

There is provided a method that includes (a) presenting, via a communications network, a first interface that enables a creditor to access a credit application template, to create a customized credit application, and (b) presenting, via the communications network, a second interface that enables a credit applicant to access the customized credit application and provide information required by the customized credit application. There is also provided a system that executes the method.

18 Claims, 12 Drawing Sheets

(56) References Cited

U.S. PATENT DOCUMENTS

2006/0267999 A1* 11/2006 Cash .................... G06Q 40/025
  345/581
2007/0011083 A1* 1/2007 Bird ....................... G06Q 30/08
  705/38
2007/0067467 A1* 3/2007 Kennedy et al. ............. 709/229
2008/0109349 A1* 5/2008 Jenich .................. G06Q 40/025
  705/38
2009/0144188 A1* 6/2009 Colabucci ............ G06Q 40/025
  705/38

OTHER PUBLICATIONS

Canadian Search Report dated Oct. 30, 2013, Corresponding to Canadian Patent Application No. 2,639,257, 4 pages.
Canadian Office Action dated Nov. 7, 2014, Corresponding to Canadian Patent Application No. 2,639,257, 4 pages.
Canadian Office Action dated Feb. 29, 2016 Corresponding to Canadian Patent Application No. 2,639,257, 6 pages.

* cited by examiner

CFA Prototype - DNBi - Microsoft Internet Explorer

File  Edit  View  Favorites  Tools  Help

Back ▾ | Address http://dali.dnbgp.dnb.com/UIPrototype/CFA_UI_Package/Add_Logo_Default.html    ▾ Go DNBi > Admin > Configure Your Credit Application Home

Configure Your Credit Application

☐ Preview   ☐ Print

Step 1: Add Your Own Branding — *502*

Customize Branding

Step 2: Select Questions to include. — *504*

Personalize your application form with your company logo and address. A preview will display at the bottom of this page.

Step 3: Finalize Application — *506*

Do you wish to display your Company Name and/or Address?   ● Yes  ○ No

Company Name:  [Lorem Ipsum, Inc.]
  Street Address: [123 Main Street, Suite ABC]
  City, State, Zip Code: [Somewhere, US 01234]   — *510*

Do you wish to provide a contact phone and/or fax number(s)?   ○ Yes  ● No
(List fax number to give applicants the option of printing the application and sending by fax.)

Do you wish to upload a logo?   ○ Yes  ● No

Preview

Lorem Ipsum, Inc.
123 Main Street, Suite ABC
Somewhere, US 01234

CFA Prototype - DNBi - Microsoft Internet Explorer

File  Edit  View  Favorites  Tools  Help

Back ▾  ⊗  ⇧  Search  ☆ Favorites  ◎  ⊠ ▾  ⬜ ▾  ◻

Address  http://dali.dnbgp.dnb.com/UI/Prototype/CFA_UI_Package/APP_Company_Information.html  Go Logo Lorem Ipsum Inc.
123 Main Street, Suite ABC
Somewhere, US 01234
Contact Phone Number: (123) 456-7890

910

Credit Application

The credit application has 4 sections: Company Information, Company Financials, Trade and Bank References, and Guarantors.
> While filling out any section, you can save you work for continuing later. You will then have 30 days to complete the application.
> When you have finished entering your data, just before final submission, you will have a last opportunity to review and edit any of your responses.

Company Information

Company Details          * = required field

Business Name*  [        ]
Address Primary Street (No P.O. Boxes)* [        ]
Secondary Street Address* [        ]
City* [        ]
State* [  ▸]
Zip Code* [     ]
Company Phone* [        ]
Website Address* [        ]
D-U-N-S® Number* [        ]

920

Contact Information

First Name [              ]

Done                                                           Local intranet

Fig. 9

DNBi — Power. Freedom. Confidence.

John Doe | My Profile | Help | Sign Out    DNBi [Select Product] GO

Dashboard | Companies | News & Alerts | Credit Application | Account Manager | Decision Maker | Admin Search [ ] Search    More Options You are in: Lorem Ipsum Inc.

Credit Application Home

View: [ ▼ ]    [Filter] [Reset List]

Show company names that begin with:
A B C D E F G H I J K L M N O P Q R S T U V W X Y Z # All

Get Decision Maker [Learn More >]
Let Decision Maker help you evaluate new credit applications

[Copy To Folder] [Delete]

First | <Previous | Items 1-10 of 10 | Next> | Last

| Type | Company | PAYDEX | Commercial Credit Score Percentile | Financial Stress Class | Submitted ▼ |
|---|---|---|---|---|---|
| APPLICATION #FCCXQX3M | PLANET CONSTRUCTION 1893 WALTER ROAD DELORIS, OH - 1234567 | | 97 | 1 | 07/02/2007 1:00 PM PST |
| APPLICATION 3FCCX12345 | WILSON CEMENT 89345 INDUSTRIAL HWY, BISON, AZ - 1234567 | | | | 07/02/2007 1:00 PM PST |
| APPLICATION #FCCPDFW8 | GRASS VALLEY GARDENS 89 FRONTAGE ROAD GRASS VALLEY, CA - 998045 | 1 | 97 | 1 | 07/02/2007 1:00 PM PST |

*CFA Prototype — DNBi — Microsoft Internet Explorer*

File  Edit  View  Favorites  Tools  Help

Back ▼ | Address: http://dali.dnbgp.dnb.com/UIPrototype/CFA_Front_End/cfa-DM-1.html   Go

| | | | | |
|---|---|---|---|---|
| 2 | Bank of Toronto | 23-456-7890 | 80 | 90 | 55 | 482 | 1422 |
| 3 | Gorman US, Inc. | 34-567-8901 | 75 | * | * | 307 | 1366 |
| 4 | Bank of America | 45-678-9012 | 80 | * | * | 466 | 1395 |

More>>

Showing companies from All Companies folder with percentiles and classes for Canadian companies.

For the Branches above, the Financial Stress and Credit scores are for the Headquarters locations. Branch locations are not scored.

Risk Distribution: Financial Stress Score     Edit   ✕

HIGH - High Risk - average 30 to 120 days beyond terms.
▭ 1 (0.13%)

MEDIUM - MEDIUM Risk - average 30 or less beyond terms.
▭ 73 (2.55%)

LOW - Low Risk - average prompt payment to 30+ days before terms
▭ 19 (2.55%)

NA* - Unknown Risk - Data not available for these companies
▭ 653 (67.53%)

*Canadian Companies in All Companies folder.*

The count above reflect unique components identified by D-U-N-S® Number. They do not include instances where you have multiple accounts associated with a single comany

Last Applicant Submitted Application

| Company Name & DUNS Number | Submitted Date |
|---|---|
| GEARY'S LLC. 00-599-0502 | 07/09/2007 |
| VALMED PHARMACEUTICAL 15-350-8619 | 07/09/2007 |
| PHASE 1 TECHNOLOGY CORP 16-163-6469 | 07/09/2007 |
| WAL-MART PHARMACY OF MICHIGAN 80-534-7879 | 07/09/2007 |
| DUN&BRADSTREET, INC 60-828-7236 | 07/09/2007 |
| A&A 12-738-5396 | 07/14/2007 |
| LE GOURMET CHEF, INC 12-215-2382 | 07/16/2007 |
| BINNEY & SMITH INC. 00-137-4909 | 01/17/2007 |

View More

Done                                                  Local intranet

*Fig. 12*

ONLINE UNIVERSAL CREDIT APPLICATION

BACKGROUND OF THE INVENTION

1. Field of the Invention

The present disclosure relates to credit applications, and, more particularly, to a credit application that a credit applicant accesses online, e.g., via the Internet.

2. Description of the Related Art

It is not uncommon for a person or a business to either borrow money from a lender for general purposes, or to seek credit for a purchase of goods or services from a seller. In such situations, the person or business seeking the loan or the credit is a credit applicant, and the lender or the seller extending the credit is a creditor.

Systems and methods presently exist in which the credit applicant can access a credit application on line, e.g., via the Internet. A conventional approach is for a credit applicant to complete the credit application, and then send the completed credit application to the creditor. The creditor, in turn, receives the credit application, and often engages a credit evaluation service provider, e.g., Dun and Bradstreet, that evaluates business credentials of the credit applicant and renders a report as to the credit applicant's credit worthiness. The creditor thereafter considers the report when making a decision as to whether to extend the loan or the credit to the credit applicant.

A drawback of the conventional approach is that credit applications typically supplied by would-be creditors to would-be borrowers are not easily customizable. Credit applications having limited and non-customized features may not allow a creditor to extract the most pertinent lending-related data from a credit applicant. This is a disadvantage that propagates, in turn, to the credit evaluation service provider retained by the creditor. Accordingly, the quality of a credit-extension decision may be less than optimal.

Another drawback of the conventional approach is that the creditor must engage in an extra step of transmitting a received credit application to a selected credit evaluation service provider. This extra step represents additional overhead, and opportunity for errors.

SUMMARY OF THE INVENTION

In order to address the foregoing disadvantages, there is provided a method that includes (a) presenting, via a communications network, a first interface that enables a creditor to access a credit application template, to create a customized credit application, and (b) presenting, via the communications network, a second interface that enables a credit applicant to access the customized credit application and provide information required by the customized credit application. There is also provided a system that executes the method.

BRIEF DESCRIPTION OF THE DRAWINGS

FIGS. 5-8 are several views of an interface that enables a creditor to access a credit application template to create and customize a credit application.

FIG. 9 is a view of an interface that enables a credit applicant to access and provide information required by a credit application.

FIGS. 10 and 11 are views of an interface that enables a creditor to review data relating to completed credit applications.

FIG. 12 is a view of an interface that allows a creditor to view credit application data entered by a credit applicant, alongside information that a credit evaluation service provider has accumulated about the credit applicant.

DESCRIPTION OF THE INVENTION

Figure 1:
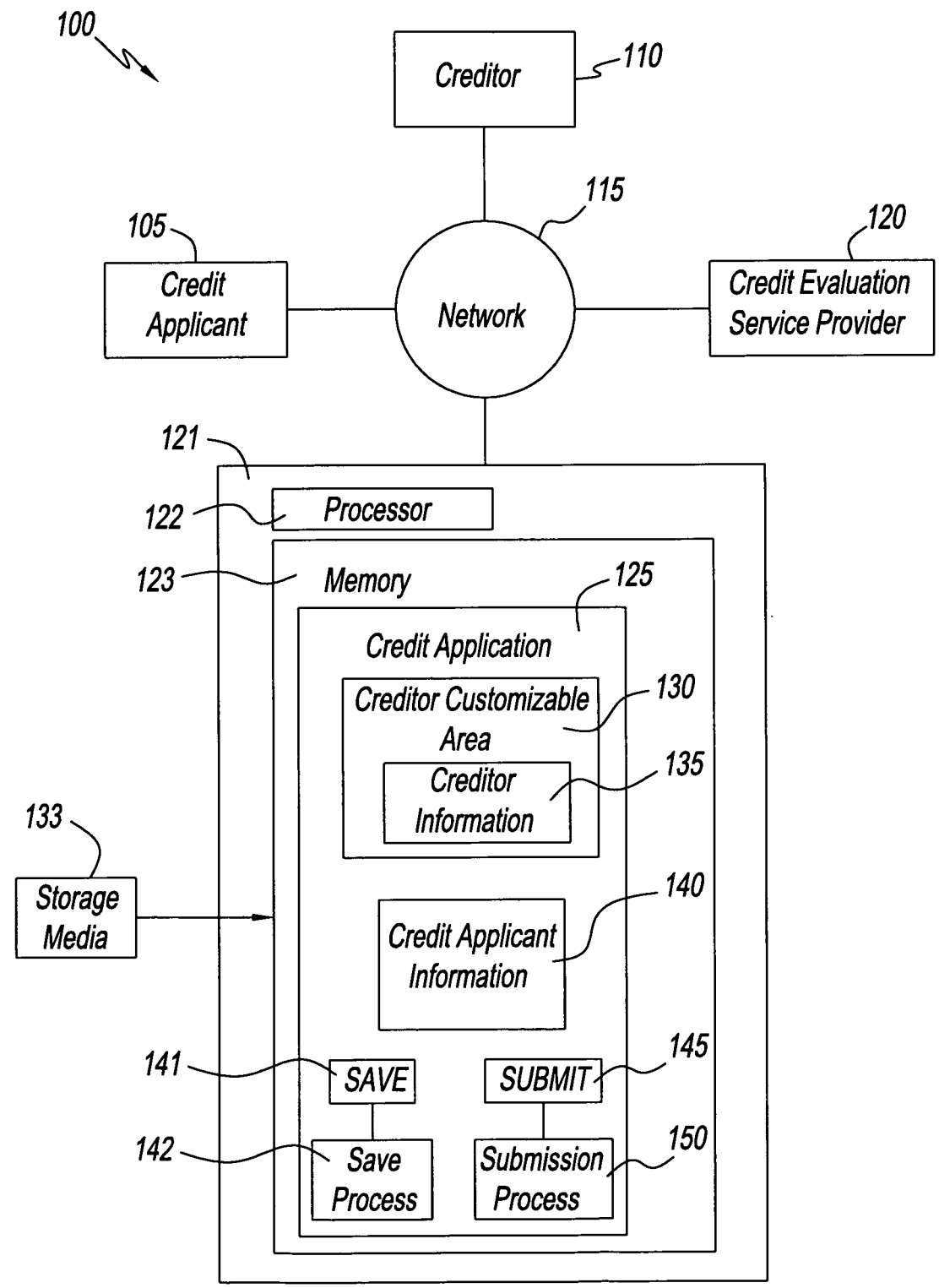
FIG. 1 is a block diagram of a system that enables a creditor to customize a credit application, and enables a credit applicant to access and submit the credit application.

FIG. 1 is a block diagram of a system 100 that enables a lender, i.e., a creditor, to customize a credit application, and enables a borrower, i.e., a credit applicant, to access and submit the credit application.

A credit applicant 105, a creditor 110, and a credit evaluation service provider 120 participate in system 100. Credit applicant 105 is an entity that may be, for example, a person or a business that either desires to borrow money from a lender for general purposes, or desires to seek credit for a purchase of goods or services from a seller. Creditor 110 may be a seller of goods or services to be bought on credit by credit applicant 105. Credit evaluation service provider 120 serves credit applicant 105 and creditor 110, by assisting creditor 110 in making a decision of whether to extend credit to credit applicant 105.

A network 115 provides connectivity between and among credit applicant 105, creditor 110, credit evaluation service provider 120, and a computer 121. Network 115 can be, for example, a telephone network, the Internet, a virtual private network, a wired network, or a wireless network.

Computer 121 includes a processor 122 and a memory 123. Memory 123 can be, for example, a random access memory device. Memory 123 contains instructions, such as a software module, that when executed by processor 122, cause processor 122 to instantiate a credit application 125, or indeed to perform any of the methods disclosed herein. The term "module" is used herein to denote a functional operation that may be embodied either as a stand-alone component or as an integrated configuration of a plurality of subordinate components. Although computer 121 is represented herein as a standalone system, it is not limited to such, but instead can be coupled to or distributed across other computer systems (not shown) via network 115.

Credit application 125 is a data structure through which credit applicant 105 applies for credit from creditor 110. That is, credit applicant 105 accesses credit application 125, for example, via a browser, and provides information about itself, so that creditor 110 can decide whether to extend credit to credit applicant 105.

Credit application 125 is, initially, a template, and is customized by creditor 110. Credit application 125 includes a creditor customizable area 130, and an area for credit applicant information 140. Creditor 110 accesses credit application 125 via a graphical user interface, e.g., a browser, and is permitted to modify the look and feel of credit application 125, and modify credit application 125 with regard to the type of information that creditor 110 requires from credit applicant 105. The graphical user interface can be instantiated within memory 123 of computer 121, or within a memory of a separate computer, and presented on a display. Creditor 110 can customize creditor customizable area 130 for example, by adding, deleting, or modifying data fields, or by including a logo or other content that creditor 110 wishes to present on credit application 125. Creditor customizable area 130 includes creditor information 135, where creditor 110 can include a brand logo and contact information, and include questions that are pertinent to creditor 110's credit policy. Credit applicant information 140 is an area in which credit applicant 105 provides information about itself.

Credit application 125 can be hosted by credit evaluation service provider 120, and made available to credit applicant 105 via a weblink. For example, in a case where network 115 is the Internet, creditor 110 can install a link on a web page, or send the link to credit applicant 105 via email. Thus, creditor 110 can invite its customer, i.e., credit applicant 105, to a web-based application branded as that of creditor 110, but hosted and maintained by credit evaluation service provider 120.

Credit application 125 has (A) a SAVE button 141 and a save process 142 associated therewith, and (B) a SUBMIT button 145 and a submission process 150 associated therewith. The operations of SAVE button 141, save process 142, SUBMIT button 145 and submission process 150 are described in greater detail below, in association with process 300.

Although system 100 is described herein as having credit application 125 instantiated in memory 123, the instructions can be tangibly embodied on an external computer-readable storage media 133 for subsequent loading into memory 123. Storage media 133 can be any conventional storage media, including, but not limited to, a magnetic storage medium, an optical storage medium, a magneto-optical storage medium, a flash memory, or a ROM. The instructions could also be embodied in a random access memory, or other type of electronic storage, located on a remote storage system and coupled to memory 123.

Moreover, although instructions for credit application 125 are described herein as being installed in memory 123, and therefore being implemented in software, they could be implemented in any of hardware, firmware, software, or a combination thereof.

Also, although credit application 125 is shown as residing in computer 121, credit application 125 can reside on any device that can be accessed via network 115. For example, credit application 125 could reside in a computer associated with creditor 110 that is accessed by credit applicant 105. Alternatively, credit application 125 could be copied from memory 123, and installed on a computer associated with credit applicant 105.

Via network 115, processor 122 presents an interface to creditor 110 that enables creditor 110 to access a credit application template to create a customized version of credit application 125. The interface, which is provided by a software module accessed by creditor 110, enables creditor 110 to create a form. The input of creditor 110 into the form is used to construct credit application 125, to suit particular needs of creditor 110. The particular needs of creditor 110 may call for selection of particular questions and logos for inclusion on credit application 125.

Also via network 115, processor 122 presents an interface that enables credit applicant 105 to access credit application 125 and provide information required by credit application 125. Credit applicant 105 provides credit applicant information 140 and completes credit application 125 by using a browser to answer questions, and select menu items.

Credit evaluation service provider 120 receives credit application 125 after it is completed by credit applicant 105. Credit evaluation service provider 120 evaluates credit applicant information 140 to yield a credit report regarding credit applicant 105, and appends to credit application 125 data regarding credit applicant 105's credit status. Such data may include information such as credit applicant 105's revenues, number of employees, and number of years in business. Credit evaluation service provider 120, in evaluating credit applicant information 140, accesses a database to store credit applicant information 140, and to obtain or produce supplemental information, such as an automated credit score or a decision recommending that credit applicant 105 be extended a given amount of credit, for evaluating credit applicant information 140. Credit evaluation service provider 120 may also append the supplemental information to credit application 125.

Creditor 110 is able to consult a repository, such as a database, wherein a completed version of credit application 125 is stored. Creditor 110 reviews the completed credit application 125 and the data appended thereto by credit evaluation service provider 120, and makes a decision of whether to extend credit to credit applicant 105. Creditor 110 may undertake such review by accessing completed credit application 125 from credit application service provider 120, via network 115. The supplemental data appended to the completed credit application 125 may include a credit limit amount that credit application service provider 120 recommends to be extended to credit applicant 105 by creditor 110.

Figure 2:
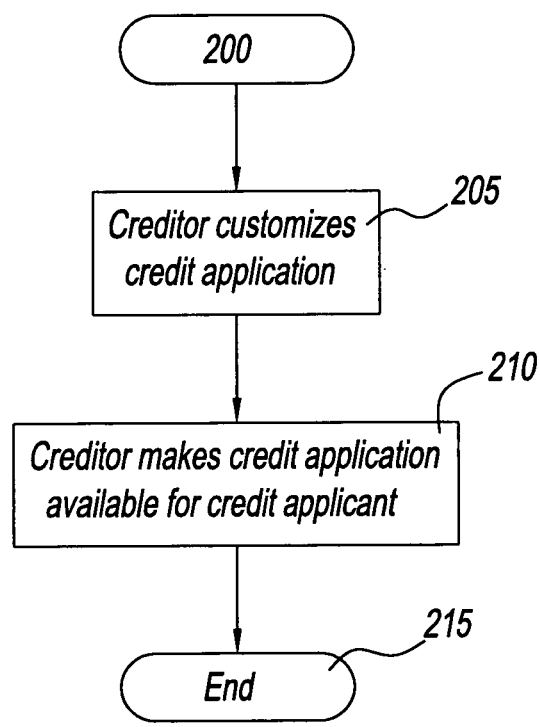
FIG. 2 is a flowchart of a process for a creditor to access and customize a credit application.

FIG. 2 is a flowchart of a process 200 in which creditor 110 configures credit application 125. As mentioned above, via network 115, processor 122 presents an interface to creditor 110 that enables creditor 110 to access the credit application template to create a customized version of credit application 125. Process 200 commences with step 205.

In step 205, creditor 110 accesses and customizes credit application 125. Generally, creditor 110 is permitted to customize the look and feel of credit application 125, so that credit application 125 takes on a particular appearance when presented on a display. Creditor 110 is also permitted to modify credit application 125 with regard to the type of information that creditor 110 requires from creditor 105. That is, creditor 110 can configure credit application 125 to dynamically respond to how credit applicant 105 fills out credit application 125, with conditional questions, to maximize a chance that credit applicant 105 can obtain an automated approval by entering the least amount of detail. For example, a smaller company may be required to fill out a bank and trade section, whereas a larger company may not be required to do so. Process 200 next proceeds to step 210.

In step 210, creditor 110 makes credit application 125 available for credit applicant 105. That is, creditor 110 stores credit application 125 in system 100 in a manner that allows credit applicant 105 to access credit application 125. As mentioned above, credit application 125 can be hosted by credit evaluation service provider 120, and made accessible via network 115 to credit applicant 105 via a weblink provided on a web page accessible to credit applicant 105, or provided to credit applicant 105 via an email. The weblink leads credit applicant 105 to, e.g., a web page for accessing credit application 125. Process 210 next proceeds to step 215.

In step 215, process 200 ends.

Figure 3:
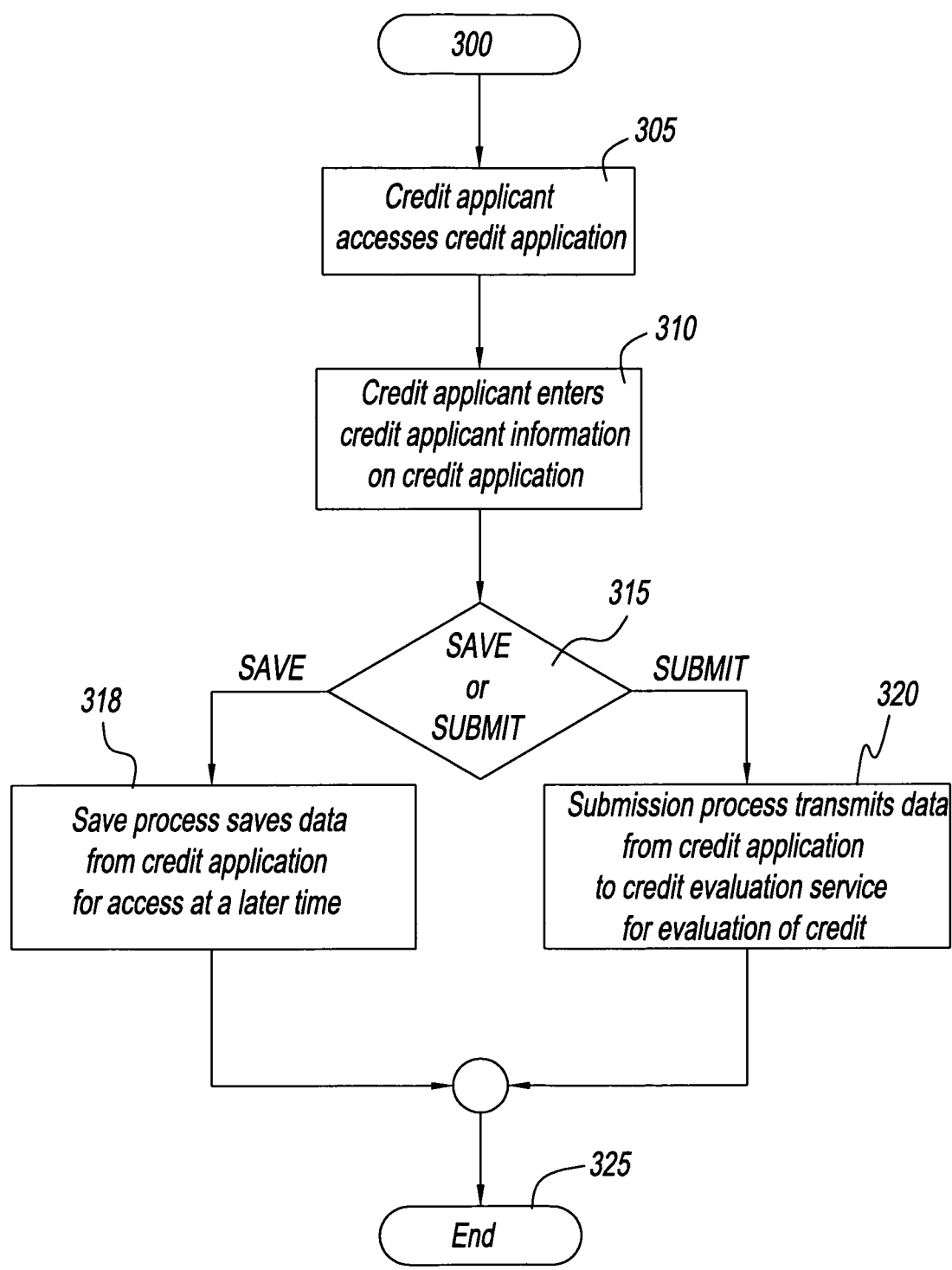
FIG. 3 is a flowchart of a process in which a credit applicant provides information about itself on a credit application.

FIG. 3 is a flowchart of a process 300 in which credit applicant 105 provides information about itself on credit application 125. As mentioned above, via network 115, processor 122 presents an interface that enables credit applicant 105 to access credit application 125 and provide information required by credit application 125. Process 300 commences with step 305.

In step 305, credit applicant 105 accesses credit application 125. Process 300 next proceeds to step 310.

In step 310, credit applicant 105 enters credit applicant information 140 on credit application 125. Process 300 next proceeds to step 315.

In step 315, credit applicant 105 indicates whether to (A) save credit application 125, so that it can be submitted at a later time, or (B) presently submit credit application 125. If credit applicant 105 wishes to save credit application 125, then credit applicant 105 activates SAVE button 141, and process 300 proceeds to step 318. If credit applicant 105 wishes to presently submit credit application 125, then credit applicant 105 activates SUBMIT button 145, and process 300 proceeds to step 320.

In step 318, save process 142 saves information that credit applicant 105 has entered into credit application 125, obtains an application ID, and presents the application ID to credit applicant 105. The data can be saved in a storage device hosted by credit evaluation service provider 120, for some period of time, for example, for 30 days, and can be accessed by credit applicant 105 using the application ID. Process 300 next proceeds to step 325.

In step 320, submission process 150 transmits data from credit application 125, over network 115, to credit evaluation service provider 120 for evaluation of credit applicant 105's credit. Process 300 next proceeds to step 325.

In step 325, process 300 ends.

Figure 4:
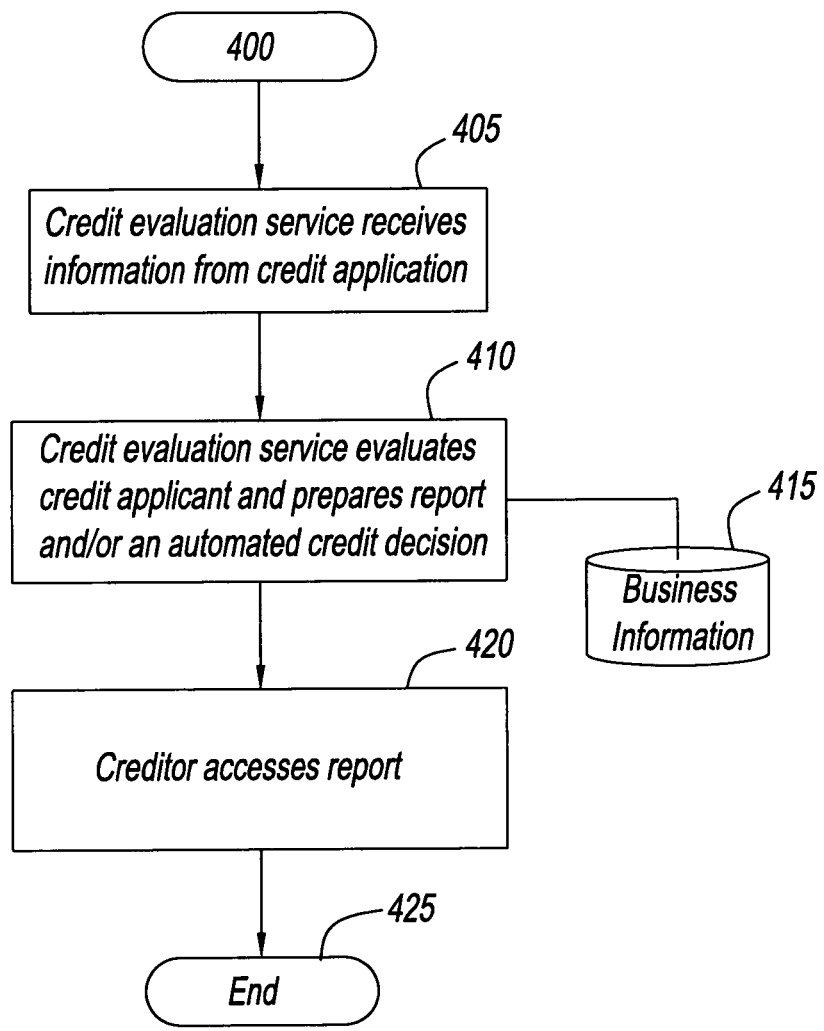
FIG. 4 is a flowchart of a process in which a credit evaluation service provider processes a credit application.

FIG. 4 is a flowchart of a process 400 in which credit evaluation service provider 120 processes credit application 125. Process 400 commences with step 405.

In step 405, credit evaluation service provider 120 receives information from credit application 125. Process 400 next proceeds to step 410.

In step 410, credit evaluation service provider 120 evaluates credit applicant 105 for credit worthiness and prepares a credit report and/or an automated credit decision. In evaluating credit applicant 105, credit evaluation service provider 120 consults a store of business information 415. Business information 415 may be stored in any suitable data structure, which need not be local to credit evaluation service provider 120.

Business information 415 includes metrics for assessing a risk of extending credit to credit applicant 105. These metrics may include models or trade data. For example, credit evaluation service provider 120 may use statistical models to predict the likelihood that credit applicant 105 will default on a loan. In practice, business information 415 can include thousands of sources of data, as well as scores based on statistical models that assign general risk classification of a business, credit rating, likelihood of bankruptcy, and payment behaviors.

From step 410, process 400 proceeds to step 420.

In step 420, creditor 110 accesses the credit report and/or the automated credit decision via network 115. Creditor 110 has the ability to view credit application 125 data entered by credit applicant 105, alongside information that credit evaluation service provider 120 has accumulated about credit applicant 105, to automatically apply decision rules that creditor 110 has previously specified, based on creditor 110's own credit policy, preferably, without any human intervention. If creditor 110 chooses not to set up specific credit rules, creditor 110 can simply evaluate the information entered by credit applicant 105 along data on credit applicant 105 provided by credit evaluation service provider 120. Process 400 next proceeds to step 425.

In step 425, process 400 ends.

FIGS. 5-8 are several views of an interface 500 that enables creditor 110 to access the credit application template to create and customize credit application 125. The creation and customization is accomplished in three general steps, namely steps 502, 504 and 506.

Referring to FIG. 5, in step 502, creditor 110 interacts with a branding customization area 510. Branding customization area 510 provides fields for entry of data such as company name and address, and provides a facility whereby creditor 110 may upload a logo.

Figure 6:
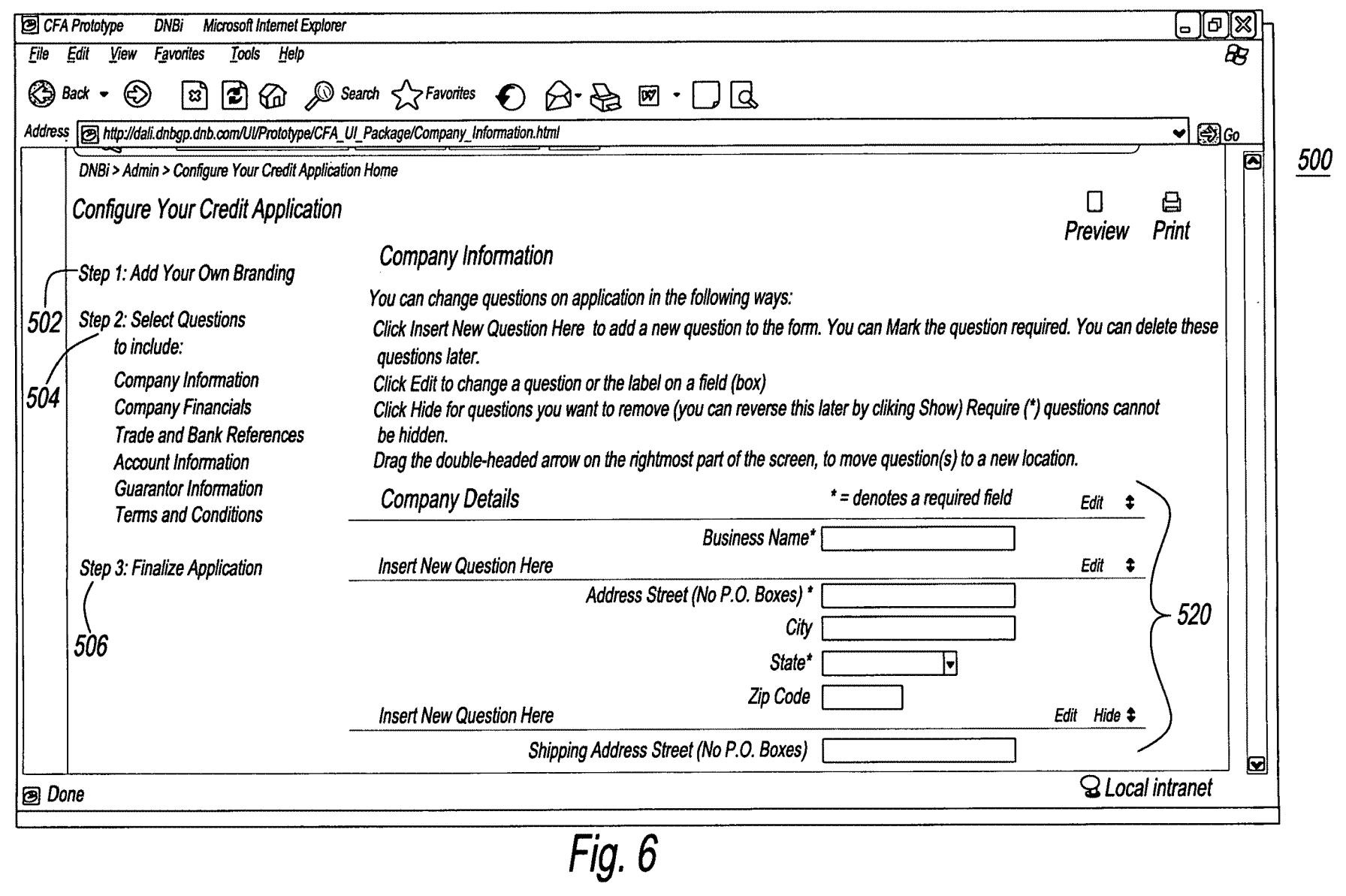

Referring to FIG. 6, in step 504, creditor 110 interacts with a question customization area 520. Question customization area 520 in turn offers creditor 110 a plurality of preselected questions for inclusion on credit application 125. Questions may be selected from categories such as company information, company financials, trade and bank references, account information, guarantor information, and terms and conditions. FIG. 6 depicts questions relating to company information. The preselected questions may also be edited. Additionally, creditor 110 may include questions other than the preselected questions. Question customization area 520 further provides creditor 110 with a capability to change and rearrange the order in which questions appear.

Figure 7:
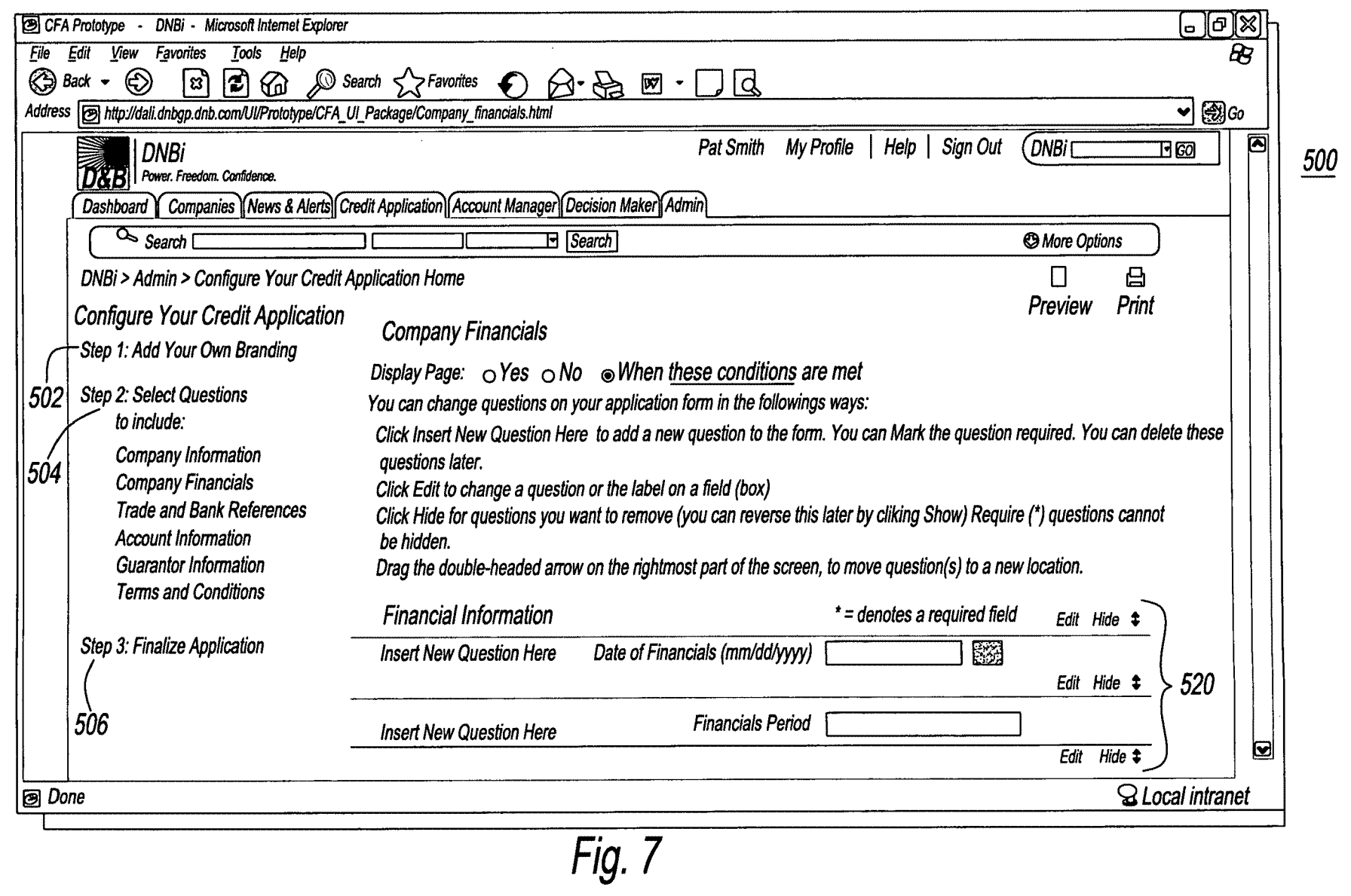

In FIG. 7, question customization area 520 shows a selection of questions relating to company financials.

Figure 8:
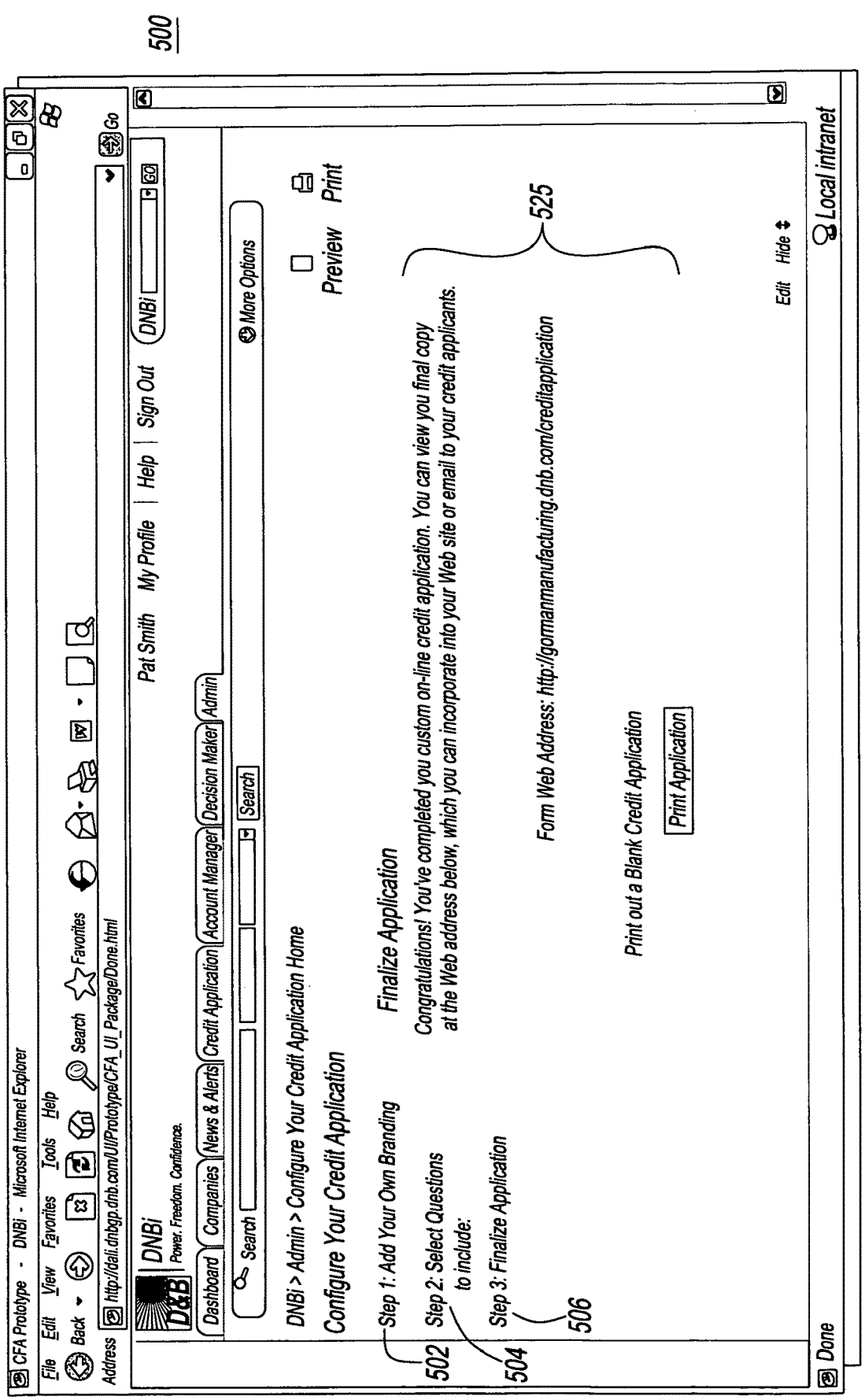

Referring to FIG. 8, in step 506, creditor 110 is presented with an application finalization area 525. Application finalization area 525 provides creditor 110 with a weblink from which credit application 125 may be accessed. Further, application finalization area 525 provides creditor 110 with a facility for printing credit application 125.

FIG. 9 is a view of an interface 900 that enables credit applicant 105 to access and provide information required by credit application 125. Interface 900 provides a logo area 910, and a question area 920. Logo area 910 is used to display a logo, graphic, or other identifier, that was provided by creditor 110 during customization of credit application 125. In question area 920, credit applicant 105 views and supplies answers to the questions specified by creditor 110 in step 504 (see FIGS. 6 and 7).

Figure 11:
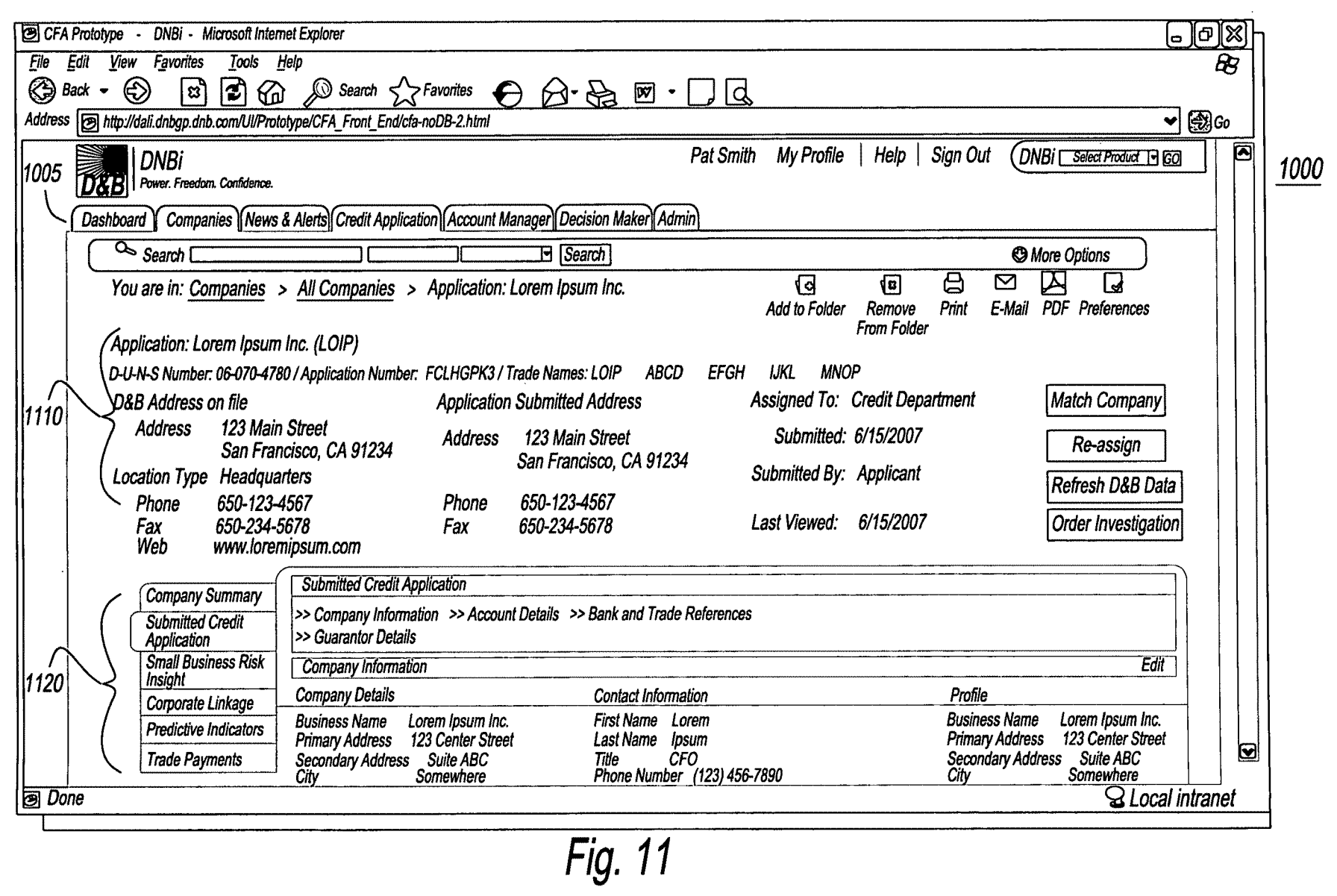

FIGS. 10 and 11 are views of an interface 1000 that enables creditor 110 to review data relating to completed credit applications 125. Interface 1000 may be implemented, for example, as a webpage.

Referring to FIG. 10, interface 1000 includes a menu tab area 1005 that provides for a selection of a plurality of high-level functions. FIG. 10 depicts a selected "Credit Application" menu tab. When the "Credit Application" menu tab is selected, view 1000 provides a search area 1010, a directory selection area 1020, and a results area 1030.

Search area 1010 provides a facility whereby creditor 110 may search for particular data. That is, creditor 110 can search for a particular credit application 125, completed by a particular credit applicant 105.

Directory selection area 1020 provides an alternate facility to search area 1010. In this regard, FIG. 10 depicts a menu for browsing by company name, alphabetically.

Results area 1030 presents a representation of, e.g., a weblink to, credit applications 125 that were retrieved in response to a search initiated via either search area 1010 or directory selection area 1020.

FIG. 11 is a view of interface 1000 when the "Companies" tab of menu tab area 1005 is selected. When the "Companies" tab of menu tab area 1005 is selected, interface 1000 presents an area 1110, and an area 1120. Area 1110 presents general information concerning a selected credit applicant 105. Area 1120 allows creditor 110 to select from a plurality of company-related menu functions. FIG. 11 depicts a selected "Submitted Credit Application" menu tab. When the "Submitted Credit Application" menu tab is selected, interface 1000 presents data relevant to a submitted credit application 125 of the selected credit applicant 105. Such data include details such as company details, contact information, and a company profile.

FIG. 12 is a view of an interface 1200 that allows creditor 110 to view credit application 125 data entered by credit applicant 105, alongside information that credit evaluation service provider 120 has accumulated about credit applicant 105 (see FIG. 4, process 400, step 420). Interface 1200 provides a risk data area 1210, and an application history area 1215. Application history area 1215 is populated by a list of credit applications 125 that have been completed by credit applicants 105. Risk data area 1210 is populated by data, computed or abstracted from a particular credit application 125, that communicate to creditor 110 the creditworthiness of credit applicant 105, i.e., the risk of extending credit to credit applicant 105.

It should be understood that various alternatives, combinations and modifications could be devised by those skilled in the art. Also, the techniques described herein are exemplary, and should not be construed as implying any particular limitation on the present invention. For example, steps associated with processes described herein can be preformed in any order, unless otherwise specified or dictated by the steps themselves. The present invention is intended to embrace all such alternatives, modifications and variances that fall within the scope of any appended claims.

The invention claimed is:

1. A method implemented by a computer, comprising:
presenting, by said computer, via an exchange of communications with a first device over a communications network, a first interface through which a creditor using said first device communicates with said computer, and in response to communications received from said creditor via said first interface, said computer performs actions of (i) accessing a credit application template to create a customized credit application customized by a creditor, said credit application being configured to dynamically respond to how a credit applicant fills out the credit application with conditional questions, to maximize a chance that the credit applicant obtains an automated approval using limited detailed input, (ii) selecting a preexisting question for inclusion in said customized credit application, (iii) editing said preexisting question in said customized credit application, (iv) including a question other than said preexisting question in said customized credit application, and (v) storing said customized credit application in a memory;
presenting, by said computer, via an exchange of communications with a second device over said communications network, a second interface through which a credit applicant using said second device communicates with said computer, and in response to communications received from said credit applicant via said second interface, said computer performs actions of (i) accessing said customized credit application from said memory, and (ii) providing information required by said customized credit application;
transmitting to a credit evaluation service provider, via said communications network, said credit application after said credit application has been completed by said credit applicant;
evaluating, by said computer, said information, to yield a credit report regarding said credit applicant;
receiving from said credit evaluation service provider, via said communications network, said credit application with at least one of data regarding credit status of said credit applicant, and an automated credit score based on statistical models;
making a decision concerning extending credit to the credit applicant by:
a. viewing, by the creditor, on a display of said first device, data entered by said credit applicant in said credit application alongside information that said credit evaluation service provider has accumulated about credit status of said credit applicant, and risk data derived from the credit application, to compare the data entered by the credit applicant with information that said credit evaluation service provider has accumulated about credit status of said credit applicant, and accessing said credit report to evaluate the credit worthiness of the credit applicant; and
b. automatically applying to said credit application, as received from said credit evaluation service provider, decision rules to determine whether credit is to be extended to said credit applicant,
wherein said evaluating comprises accessing a database to obtain supplemental information regarding said credit applicant, and
said credit report includes said supplemental information.

2. The method of claim 1, further comprising:
presenting, by said computer, via said communications network, an interface through which said creditor accesses said credit report.

3. The method of claim 2, wherein said credit report comprises a limit on an amount of credit that said creditor should extend to said credit applicant.

4. The method of claim 1,
wherein said communications network comprises the Internet, and
wherein said second interface is accessible by activation of a link that said creditor either installs on a web page or emails to said credit applicant.

5. A system comprising:
a processor; and
a storage medium that contains instructions that are readable by said processor, and that when read by said processor cause said processor to execute a method that includes:
presenting, via an exchange of communications over a communications network, a first interface through which a creditor communicates with said processor, and in response to communications received from said creditor via said first interface, said computer performs actions of (i) accessing a credit application template to create a customized credit application, customized by a creditor, said credit application being configured to dynamically respond to how a credit applicant fills out the credit application with conditional questions, to maximize a chance that the credit applicant obtains an automated approval using limited detailed input, (ii) selecting a preexisting question for inclusion in said customized credit application, (iii) editing said preexisting question in said customized credit application, (iv) including a question other than said preexisting question in said customized credit application, and (v) storing said customized credit application in a memory;

presenting, via an exchange of communications over said communications network, a second interface through which a credit applicant communicates with said processor, and in response to communications received from said credit applicant via said second interface, said computer performs actions of (i) accessing said customized credit application from said memory, and (ii) providing information required by said customized credit application;

transmitting to a credit evaluation service provider, via said communications network, said credit application after said credit application has been completed by said credit applicant, evaluating said information, to yield a credit report regarding said credit applicant;

receiving from said credit evaluation service provider, via said communications network, said credit application with at least one of data regarding credit status of said credit applicant, and an automated credit score based on statistical models;

making a decision concerning extending credit to the credit applicant by:
a. viewing, by the creditor, on a display of said first device, data entered by said credit applicant in said credit application alongside information that said credit evaluation service provider has accumulated about credit status of said credit applicant, and risk data derived from the credit application, to compare the data entered by the credit applicant with information that said credit evaluation service provider has accumulated about credit status of said credit applicant, and accessing said credit report to evaluate the credit worthiness of the credit applicant; and
b. automatically applying to said credit application, as received from said credit evaluation service provider, decision rules to determine whether credit is to be extended to said credit applicant, wherein said evaluating comprises accessing a database to obtain supplemental information regarding said credit applicant, and said credit report includes said supplemental information.

6. The system of claim 5, wherein said method further includes:
presenting, via said communications network, an interface through which said creditor accesses said credit report.

7. The system of claim 6, wherein said credit report comprises a limit on an amount of credit that said creditor should extend to said credit applicant.

8. The system of claim 5,
wherein said communications network comprises the Internet, and
wherein said second interface is accessible by activation of a link that said creditor either installs on a web page or emails to said credit applicant.

9. A storage medium having instructions encoded thereon in machine-readable format, wherein said instructions, when executed by a processor, cause said processor to carry out a method comprising the steps of:
presenting, via an exchange of communications over a communications network, a first interface through which a creditor communicates with said processor, and in response to communications received from said creditor via said first interface, said computer performs actions of (i) accessing a credit application template to create a customized credit application, customized by a creditor, said credit application being configured to dynamically respond to how a credit applicant fills out the credit application with conditional questions, to maximize a chance that the credit applicant obtains an automated approval using limited detailed input, (ii) selecting a preexisting question for inclusion in said customized credit application, (iii) editing said preexisting question in said customized credit application, (iv) including a question other than said preexisting question in said customized credit application, and (v) storing said customized credit application in a memory;

presenting, via an exchange of communications over said communications network, a second interface through which a credit applicant communicates with said processor, and in response to communications received from said credit applicant via said second interface, said computer performs actions of (i) accessing said customized credit application from said memory, and (ii) providing information required by said customized credit application;

transmitting to a credit evaluation service provider, via said communications network, said credit application after said credit application has been completed by said credit applicant;

evaluating said information, to yield a credit report regarding said credit applicant;

receiving from said credit evaluation service provider, via said communications network, said credit application with at least one of data regarding credit status of said credit applicant, and an automated credit score based on statistical models;

making a decision concerning extending credit to the credit applicant by:
a. viewing, by the creditor, on a display of said first device, data entered by said credit applicant in said credit application alongside information that said credit evaluation service provider has accumulated about credit status of said credit applicant, and risk data derived from the credit application, to compare the data entered by the credit applicant with information that said credit evaluation service provider has accumulated about credit status of said credit applicant, and accessing said credit report to evaluate the credit worthiness of the credit applicant; and
b. automatically applying to said credit application, as received from said credit evaluation service provider, decision rules to determine whether credit is to be extended to said credit applicant, wherein said evaluating comprises accessing a database to obtain supplemental information regarding said credit applicant, and said credit report includes said supplemental information.

10. The method of claim 1, further comprising:
receiving, by said computer, a communication via said second interface, indicating that said credit applicant has provided said information; and
in response to said receiving said communication:
reading, by said computer, said information from said memory; and
transmitting, by said computer, said information to a credit evaluation service provider.

11. The system of claim 5, wherein said method further includes:

receiving a communication via said second interface, indicating that said credit applicant has provided said information; and in response to said receiving said communication:
   reading said information from said memory; and
   transmitting said information to a credit evaluation service provider.

12. The storage medium of claim 9, wherein said method further includes:

receiving a communication via said second interface, indicating that said credit applicant has provided said information; and in response to said receiving said communication:
   reading said information from said memory; and
   transmitting said information to a credit evaluation service provider.

13. The method of claim 1, wherein said decision rules are applied without human intervention.

14. The method of claim 1, wherein said decision rules represent the credit policy of the creditor.

15. The system of claim 5, wherein said decision rules are applied without human intervention.

16. The system of claim 5, wherein said decision rules represent the credit policy of the creditor.

17. The storage medium of claim 9, wherein, in said method, said decision rules are applied without human intervention.

18. The storage medium of claim 9, wherein, in said method, said decision rules represent the credit policy of the creditor.

* * * * *